(12) United States Patent
Himmelsbach et al.

(10) Patent No.: US 11,821,315 B2
(45) Date of Patent: Nov. 21, 2023

(54) CUTTING ROLLER BEARING PART, CUTTING ROLLER HOLDER WITH CUTTING ROLLER BEARING PART, CUTTING WHEEL WITH CUTTING ROLLER HOLDER AND TUNNEL BORING MACHINE WITH CUTTING WHEEL

(71) Applicant: HERRENKNECHT AKTIENGESELLSCHAFT, Schwanau (DE)

(72) Inventors: Christian Himmelsbach, Schwanau (DE); Frédéric Cousseau, Plobsheim (FR); Jens Brandt, Bad Krozingen (DE)

(73) Assignee: HERRENKNECHT AKTIENGESELLSCHAFT, Schwanau (DE)

( * ) Notice: Subject to any disclaimer, the term of this patent is extended or adjusted under 35 U.S.C. 154(b) by 297 days.

(21) Appl. No.: 17/439,022

(22) PCT Filed: Mar. 12, 2020

(86) PCT No.: PCT/EP2020/056703
§ 371 (c)(1),
(2) Date: Sep. 14, 2021

(87) PCT Pub. No.: WO2020/193164
PCT Pub. Date: Oct. 1, 2020

(65) Prior Publication Data
US 2022/0145758 A1    May 12, 2022

(30) Foreign Application Priority Data

Mar. 28, 2019 (DE) .......................... 102019108002.9

(51) Int. Cl.
*E21D 9/10*      (2006.01)
*G01L 1/22*      (2006.01)
(Continued)

(52) U.S. Cl.
CPC ............ *E21D 9/003* (2013.01); *G01L 1/2206* (2013.01); *G01L 5/0004* (2013.01)

(58) Field of Classification Search
CPC ...... E21D 9/003; G01L 1/2206; G01L 5/0004
See application file for complete search history.

(56) References Cited

U.S. PATENT DOCUMENTS 4,079,795 A * 3/1978 Sackmann .............. E21D 9/003
                                                                173/4
9,845,677 B2 * 12/2017 Lenaburg .................. E21D 9/11
(Continued)

FOREIGN PATENT DOCUMENTS

CN    203772472 U    8/2014
DE    202012103593 U1    11/2012
(Continued)

OTHER PUBLICATIONS

International Search Report and Written Opinion, issued by the European Patent Office, dated Jun. 17, 2020, for International Application No. PCT/EP2020/056703; 11 pages.

*Primary Examiner* — Carib A Oquendo
(74) *Attorney, Agent, or Firm* — Faegre Drinker Biddle & Reath LLP

(57) ABSTRACT

A cutting roller bearing part, formed as a component of a cutting roller holder for a cutting wheel of a tunnel boring machine, includes a load measuring unit disposed in a receiving space assembly including though lines which is hermetically sealed against an external atmosphere by external closures and a sealing element to provide accuracy and long-term stability for load measurements.

11 Claims, 9 Drawing Sheets

(51) Int. Cl.
 E21D 9/00 (2006.01)
 G01L 5/00 (2006.01)

(56) References Cited

U.S. PATENT DOCUMENTS

| | | | |
|---|---|---|---|
| 10,539,017 B2 * | 1/2020 | Lenaburg | E21D 9/104 |
| 10,641,093 B2 | 5/2020 | Okada et al. | |
| 2009/0297273 A1 | 12/2009 | Lindbergh et al. | |
| 2014/0232167 A1 * | 8/2014 | Edelmann | E21D 9/112 |
| | | | 73/514.39 |
| 2017/0122103 A1 * | 5/2017 | Barwart | E21D 9/003 |

FOREIGN PATENT DOCUMENTS

| | | |
|---|---|---|
| DE | 102011114830 B3 | 3/2013 |
| DE | 102014105014 A1 | 10/2015 |
| DE | 102018113788 A1 | 12/2019 |
| JP | 2015-124467 A | 7/2015 |
| JP | 2016-130407 A | 7/2016 |

* cited by examiner

CUTTING ROLLER BEARING PART, CUTTING ROLLER HOLDER WITH CUTTING ROLLER BEARING PART, CUTTING WHEEL WITH CUTTING ROLLER HOLDER AND TUNNEL BORING MACHINE WITH CUTTING WHEEL

CROSS-REFERENCE TO RELATED APPLICATION

This application is a U.S. National Phase Patent Application based on International Application Serial No. PCT/EP2020/056703, filed Mar. 12, 2020, which claims priority to DE 10 2019 108 002.9, filed on Mar. 28, 2019, the entire disclosures of which are hereby explicitly incorporated by reference herein.

FIELD

The invention relates to a cutting roller bearing part, a cutting roller holder with a cutting roller bearing part, a cutting wheel with a cutting roller holder, and a tunnel boring machine with a cutting wheel.

BACKGROUND

One known cutting roller bearing part is disclosed in DE 10 2014 105 014 A1, which discloses an associated cutting roller holder, an associated cutting wheel and an associated tunnel boring machine. This previously known cutting roller bearing part for a cutting roller holder for a cutting wheel of a tunnel boring machine is equipped with a number of load measuring units and with a receiving space assembly, in which the load measuring units are arranged. In the case of this cutting roller bearing part, the load measuring units are embodied as sleeves having at least one load-sensitive element attached thereon, wherein the sleeves are arranged in form-fitting sleeve receiving holes of the receiving space assembly in at least the radial direction. The load-sensitive elements attached to the sleeves are connected via a sensor line guided out of the cutting roller bearing part to an external analysis unit, with which the signals being output from the load-sensitive elements can be processed further in particular for determining the loads acting on the cutting roller bearing part.

SUMMARY

The present invention provides a cutting roller bearing part as well as an associated cutting roller holder, an associated cutting wheel and an associated tunnel boring machine, with which the loads acting on the cutting roller bearing part can be determined in a relatively precise manner that is stable over the long term.

Due to the fact that, in the case of the cutting roller bearing part according to the invention, the or each load measuring unit has a strain gauge assembly as a load sensor, which is arranged on the base of a specially aligned sensor receiving space of the receiving assembly, and that the signal processing electronics assembly is arranged hermetically encapsulated in a region of the receiving space assembly connected to the or each sensor receiving space, the or each load measuring unit and the signal processing electronics assembly are hermetically sealed against the external atmosphere, in particular in the sense of being gas-, vapor- and water-tight, as well as being able to be directly connected with each other. This produces, with adequate sensitivity, a high reproducibility as well as a high durability with the measurement of loads acting on the cutting roller bearing part, which allows reliable conclusions to be drawn about the loads acting on a cutting roller, which is held by a cutting roller holder comprising the cutting roller bearing part according to the invention.

In one form thereof, the present invention provides a cutting roller bearing part for a cutting roller holder for a cutting wheel of a tunnel boring machine with a load measuring unit and with a receiving space assembly, which is set up to receive the load measuring unit, characterized in that the load measuring unit has, as at least one load sensor, a strain gauge assembly, which is arranged at a base of at least one sensor receiving space of the receiving space assembly configured in the cutting roller bearing part, that the load measuring unit is equipped with a signal processing electronics assembly, which is arranged in an electronics receiving space of the receiving space assembly, that the receiving space assembly has a transition channel for connecting the or each sensor receiving space to the electronics receiving space, that the or each sensor receiving space, the transition channel and the electronics receiving space are hermetically sealed on the outside and that the electronics receiving space is hermetical sealed on the inside against the external atmosphere with a sealing element that has throughlines.

DESCRIPTION OF THE DRAWINGS

Other expedient embodiments and advantages of the invention are disclosed by the following description of exemplary embodiments making reference to the figures in the drawing.

They show.

DETAILED DESCRIPTION

Figure 1:
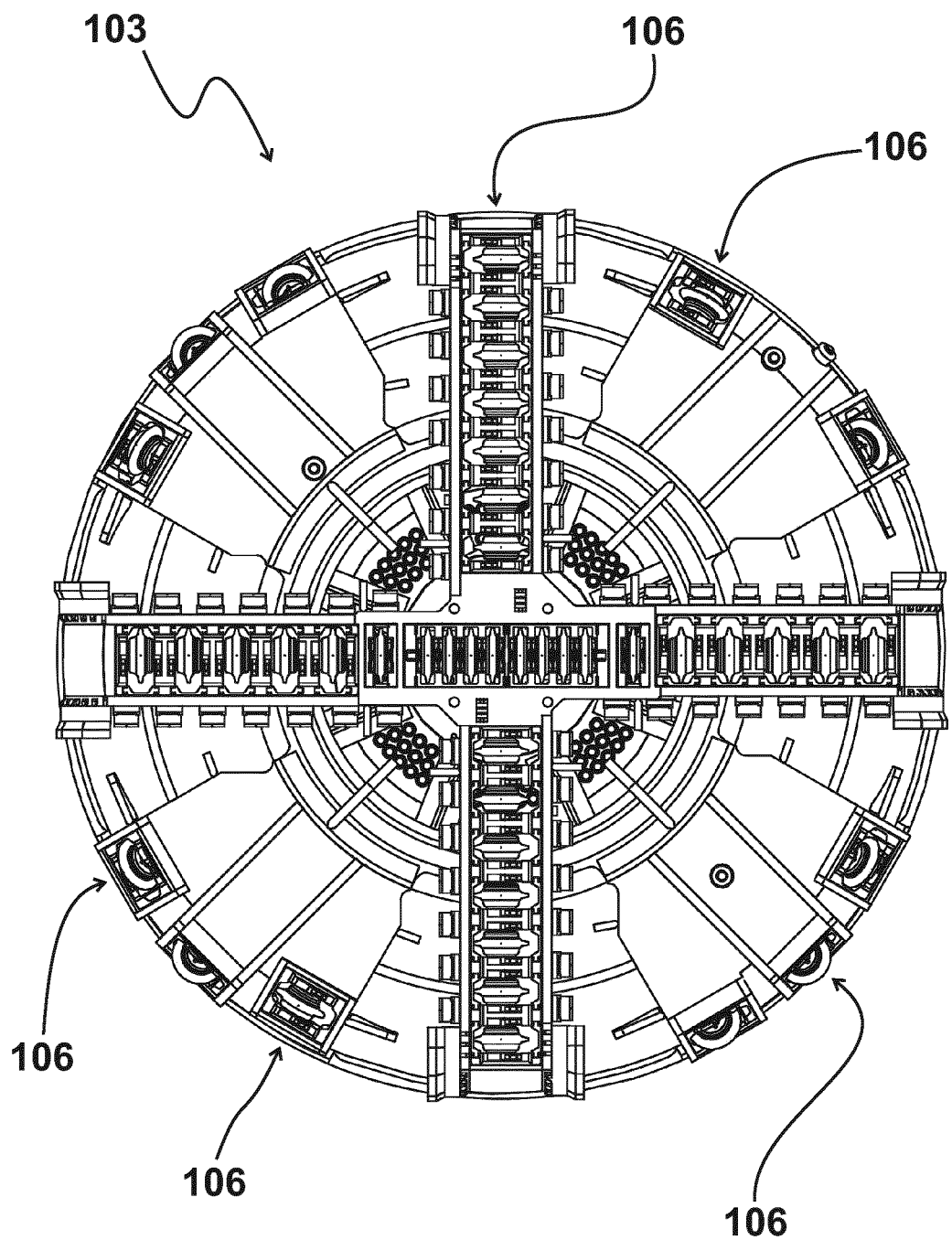
FIG. 1 A frontal view of an example of an embodiment of a cutting wheel of a tunnel boring machine, which is equipped with a number of cutting roller assemblies.

FIG. 1 shows a frontal view of an exemplary embodiment of a cutting wheel 103 of a tunnel boring machine (not shown in FIG. 1), which cutting wheel has a number of cutting roller assemblies 106 in a cross-like arrangement and on the edge side along the circumference. The cutting roller assemblies 106 are used to excavate upcoming material at the tunnel face at the cutting wheel 103 in the advancement direction of the tunnel boring machine.

Figure 2:
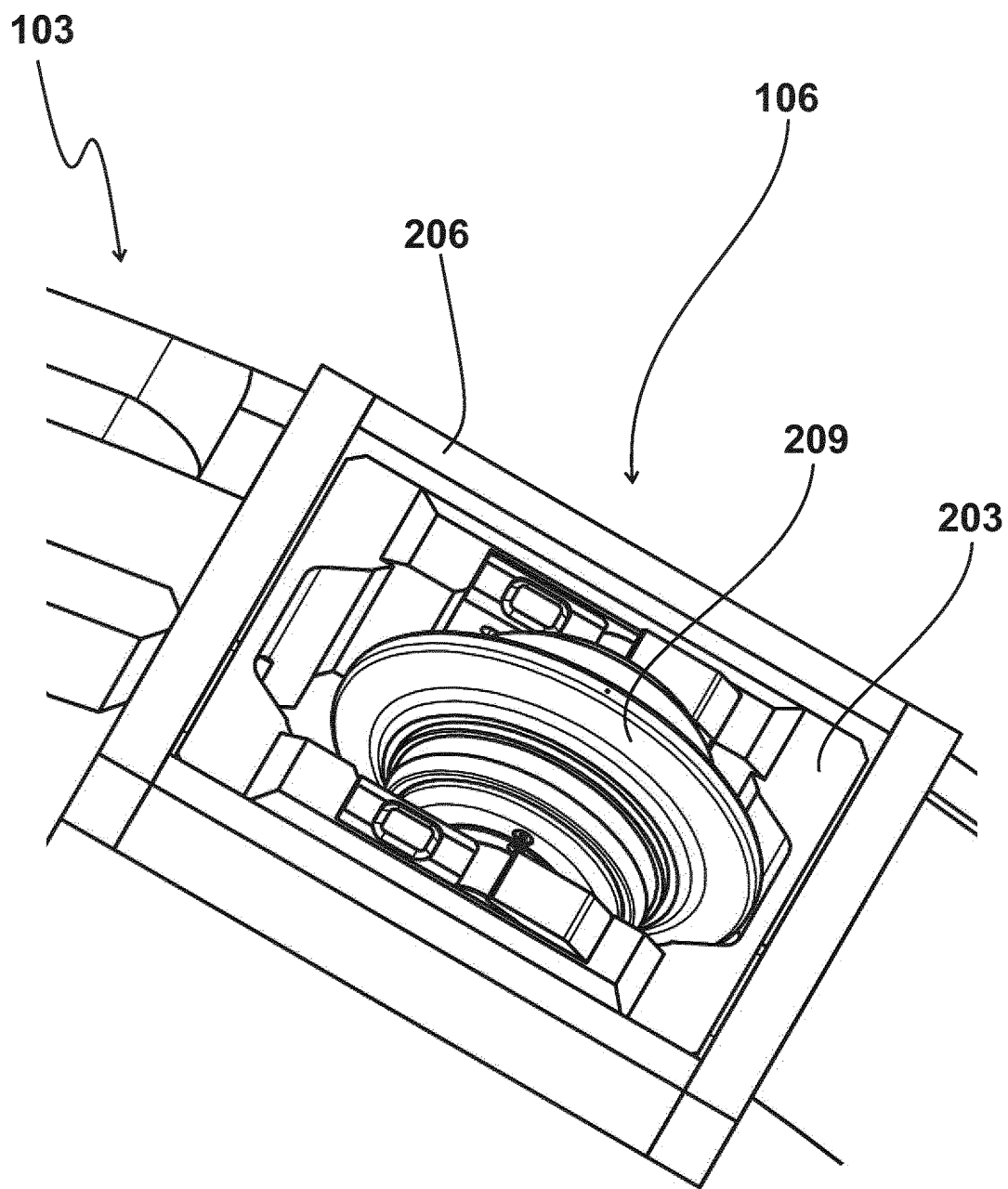
FIG. 2 A perspective view of an example of an embodiment of a cutting roller assembly which is installed on the edge side on the cutting wheel according to FIG. 1.

FIG. 2 shows a perspective view of an example of an embodiment of a cutting roller assembly 106 arranged in the upper right quadrant on the edge side of the cutting wheel 103, in the depiction according to FIG. 1. The cutting roller assembly 106 has a cutting roller holder with a cutting roller housing 203, which is built into a cutting roller box 206 of the cutting wheel 103. The cutting roller housing 203 surrounds a cutting roller 209, which protrudes over the cutting roller housing 203 and over the cutting roller box 206 in the advancement direction pointing in the direction of the viewer in the depiction according to FIG. 2.

Figure 3:
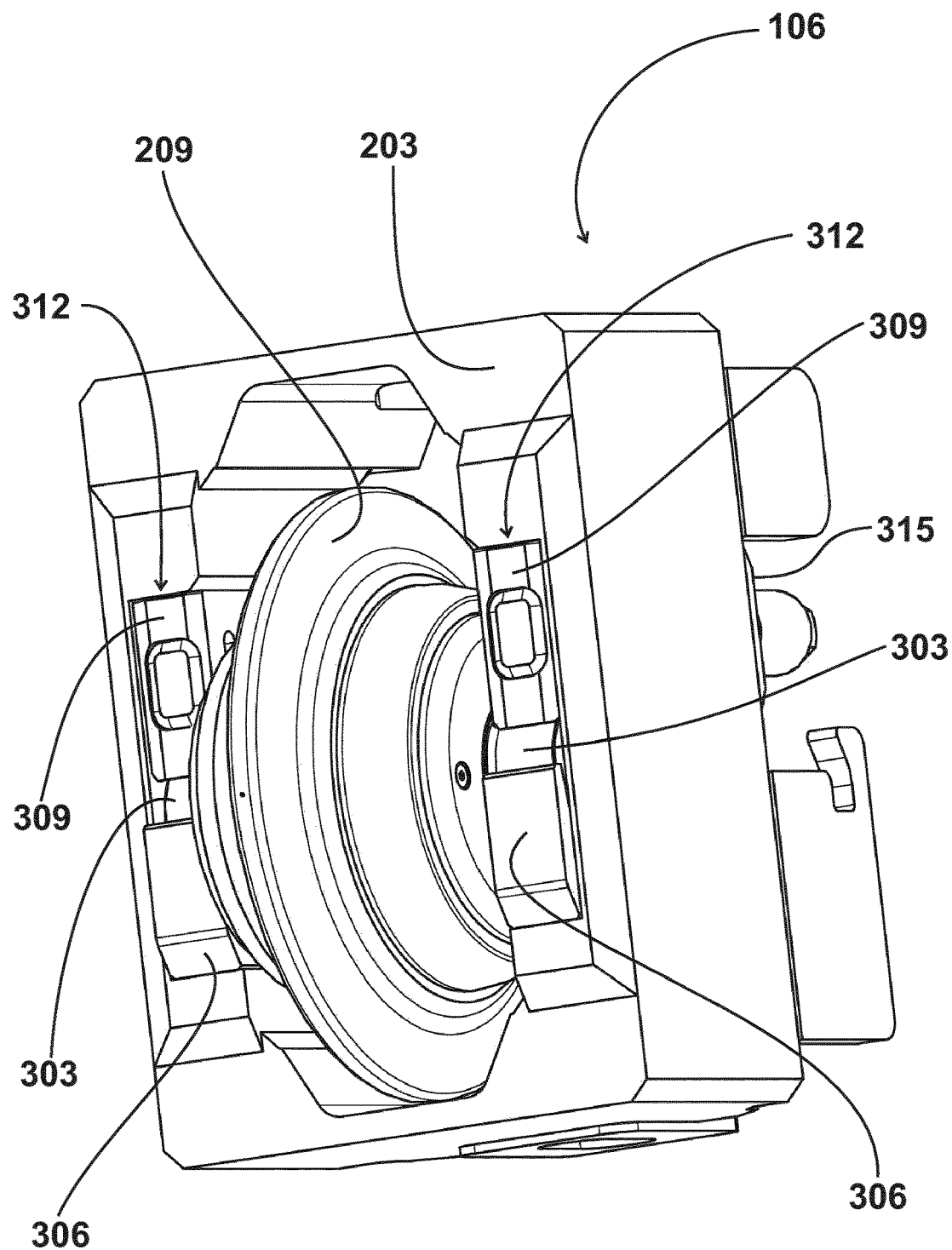
FIG. 3 A perspective view of the example of an embodiment of a cutting roller assembly with a cutting roller holder that holds a cutting roller, which cutting roller holder has a outer cutting roller housing.

FIG. 3 shows a perspective view of an example of an embodiment of a cutting roller housing 203, which holds a cutting roller 209, of the cutting roller holder according to FIG. 2. To hold the cutting roller 209 at end sections 303 of a cutting roller axle, there is respectively a C-piece 306 manufactured of metal as a cutting roller bearing part for every end section 303, and, on the side opposite from the C-piece 306, there is a wedge bearing piece 309, between which the respective end section 303 of the cutting roller axle is arranged and fastened in a rotationally fixed manner. The C-pieces 306 and the wedge bearing pieces 309 are arranged and fastened in axle bearing spaces 312 configured in the cutting roller housing 203 on the edge side. To fix the wedge bearing pieces 309, there are abutment pieces 315, which are supported on the cutting roller housing 203 on the side facing away from the wedge bearing pieces 309.

Figure 4:
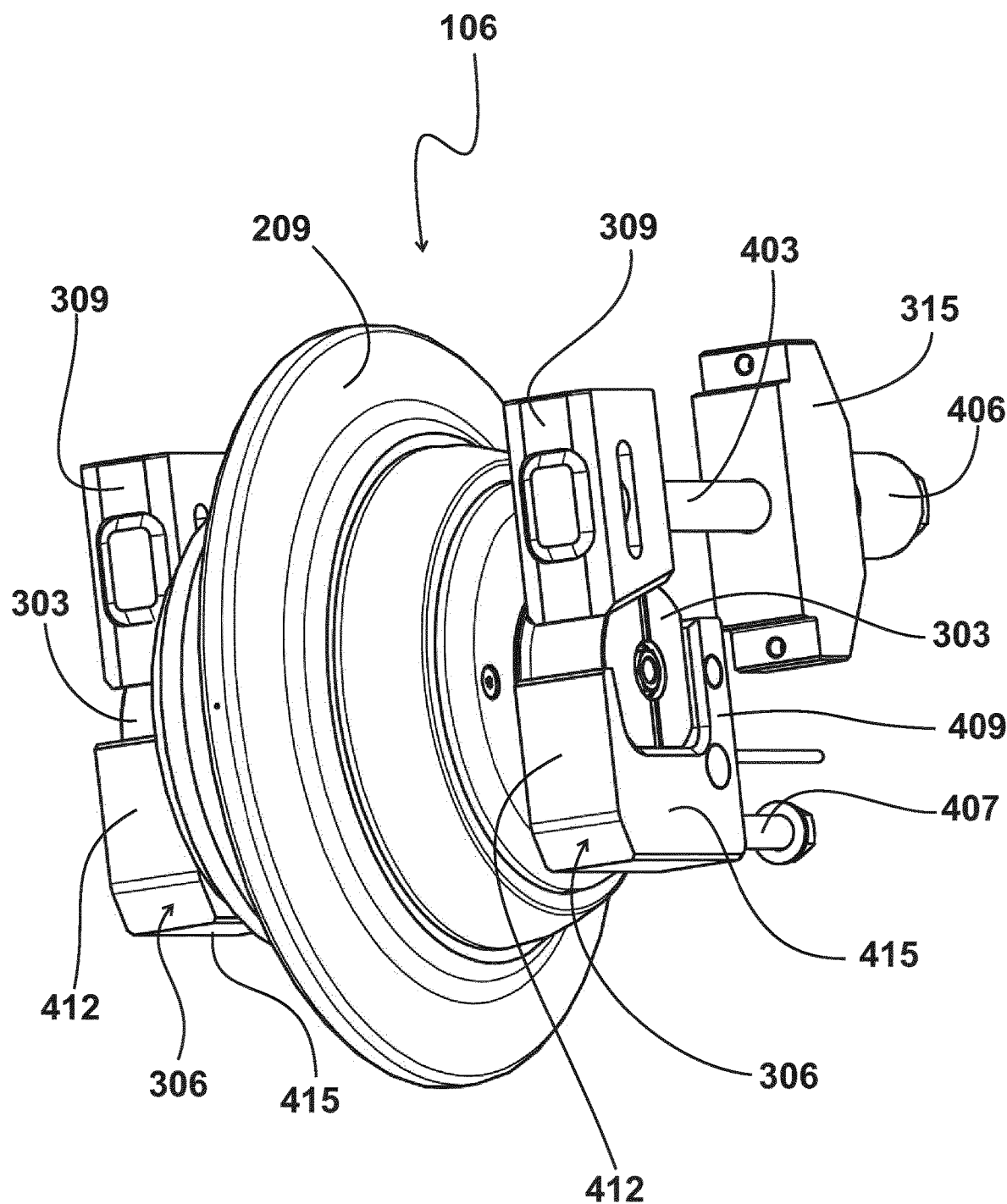
FIG. 4 A perspective view of the cutting roller with a cutting roller holder according to FIG. 3 without the cutting roller housing.

FIG. 4 shows a perspective view of the cutting roller 209 with the cutting roller holder according to FIG. 3 without the cutting roller housing 203. FIG. 4 shows that each wedge bearing piece 309 and each abutment piece 315 allocated to the relevant wedge bearing piece 309 are connected to each other via a clamping bolt 403, wherein the clamping bolt 403 is fixedly attached in the axial direction to the wedge bearing piece 309 and has, on the side of the abutment piece 315 facing away from the wedge bearing piece 309, a clamping screw cap 406 with an underlying clamping nut, so that a tightening of the clamping nut when setting up the relevant abutment piece 315 against the cutting roller housing 203 (not shown in FIG. 4) causes the wedge bearing piece 309 to be fixed without play in the cutting roller housing 203 along with the C-piece 306 and the cutting roller 209. A fastening screw 407 is connected to the measuring side piece 409 of the C-piece 306 and is able to be affixed via this to the cutting roller housing 203.

Furthermore, the depiction according to FIG. 4 shows that every C-piece 306 has in the advancement direction, when properly installed, a rear-side measuring side piece 409 and a counter side piece 412, which is shorter as compared to the measuring side piece 409, which is opposite from the measuring side piece 409 on the front side in the advancement direction. Between the measuring side piece 409 and the counter side piece 412, each C-piece 306 has a base section 415, so that, in the case of a corresponding form-fitting embodiment of the end sections 303 of the cutting roller axle, the cutting roller axle is held in a rotational fixed manner in the C-pieces 306 and is also secured against coming out of the C-pieces 306 by the wedge bearing pieces 309 that are opposite from the base sections 415.

Figure 5:
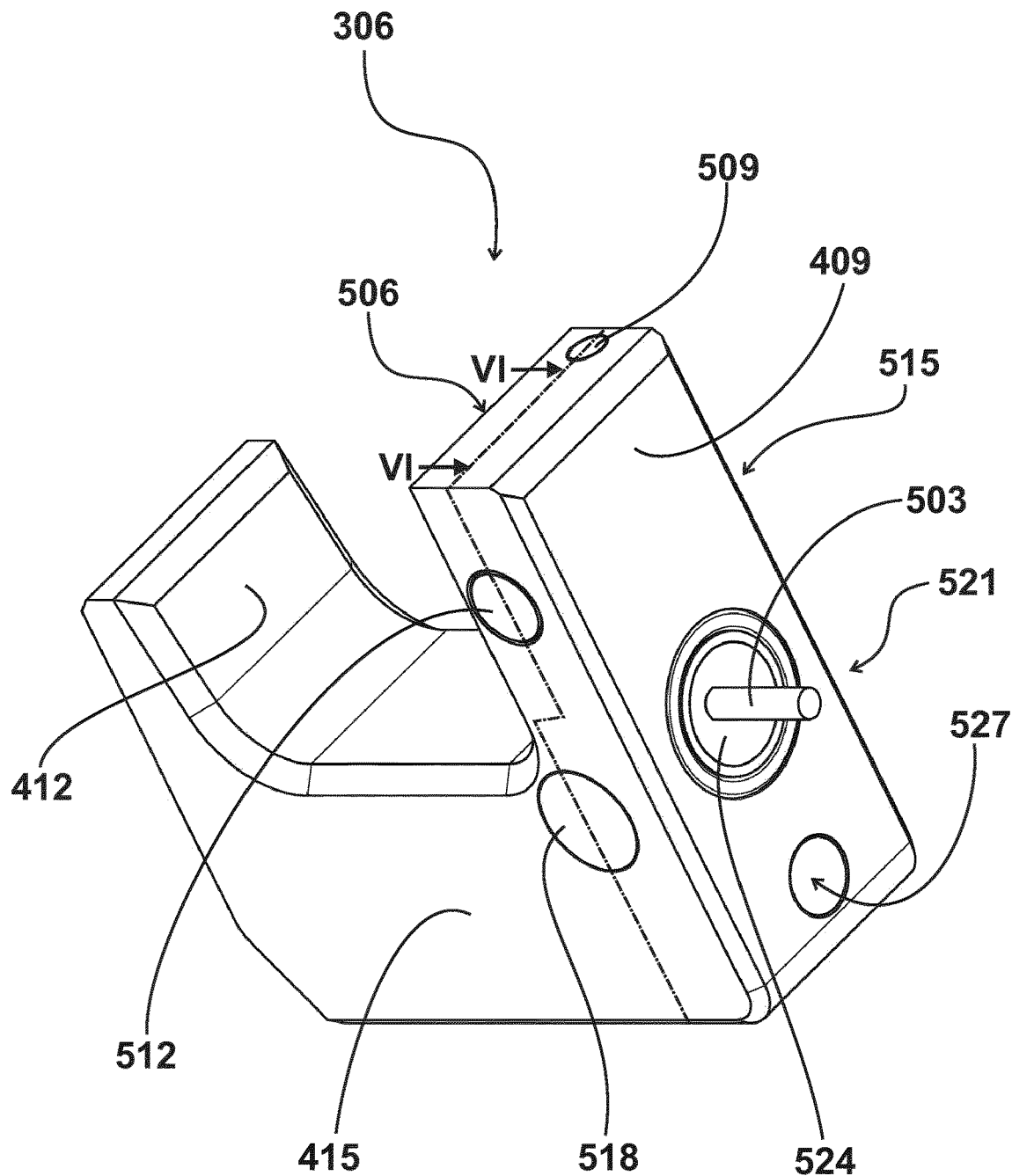
FIG. 5 A perspective view of an exemplary embodiment of a cutting roller bearing part according to the invention that is equipped with a connection cable, as it is expediently used in particular in the case of a cutting roller holder according to FIG. 2 to FIG. 4.

FIG. 5 shows a perspective view of an exemplary embodiment of a cutting roller bearing part according to the invention equipped with a connection cable 503 in the form of the C-piece 306 already cited in the case of the explanations of FIG. 3 and FIG. 4, as it is expediently used in particular in the case of a cutting roller holder according to FIG. 2 to FIG. 4. The measuring side piece 409 has a flat load bearing surface 506 facing the counter side piece 412, on which load bearing surface, when arranged as intended, an end section 303 of the cutting roller axle abuts a cutting roller 209 and, in the case of the advancement of a tunnel boring machine, initiates the force acting on the cutting roller 209 in the C-piece 306 such that, in the case of the load acting on the cutting roller 209, the measuring side piece 409 is also metrologically verifiably elastically deformed.

Configured in the measuring side piece 409, as will be explained in more detail further below, is a receiving space assembly, which receives components of a load measuring unit, which are also explained in more detail further below. To close the receiving space assembly, there are: a transition channel closure 509 on the front side at the free end of the measuring side piece 409; on the two lateral surfaces of the measuring side piece 409, a first sensor receiving space closure 512, which faces the viewer in the depiction according to FIG. 5, and a second sensor receiving space closure 515 that is opposite from the first sensor receiving space closure 512 and faces away from the viewer in the depiction according to FIG. 5; a coupling space closure 518, which faces the viewer in the depiction according to FIG. 5; an electronics receiving space closure 521, which is opposite from the coupling space closure 518 and faces away from the viewer in the depiction according to FIG. 5; and a cable feedthrough closure 524 on the rear side of the measuring side piece 409, which faces away from the counter side piece 412.

Moreover, in the exemplary embodiment according to FIG. 5, there is a blind space 527 on the rear side of the measuring side piece 409, which faces away from the counter side piece 412, which blind space is separated from the receiving space assembly and set up for anchoring the fastening screw 407.

Figure 6:
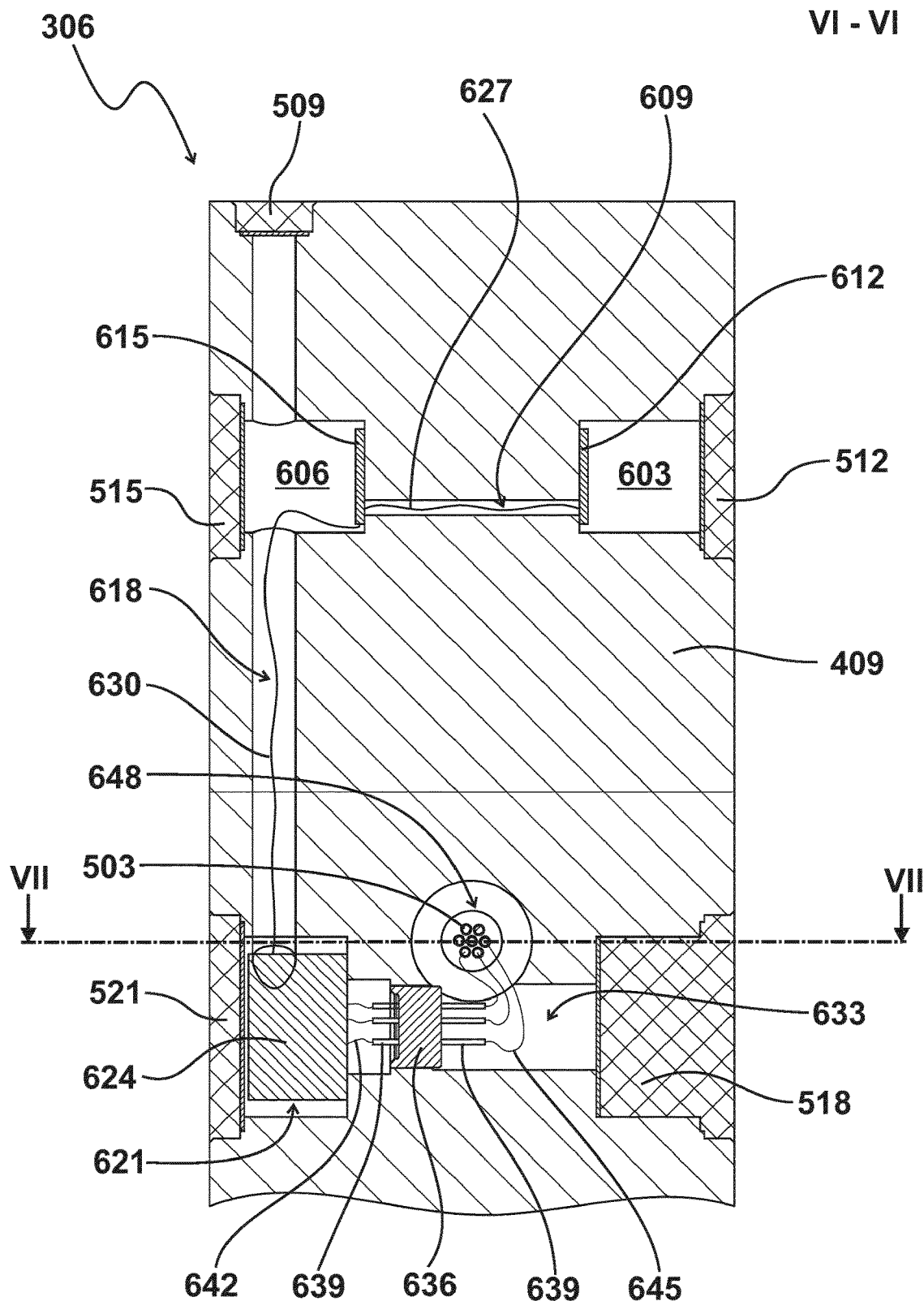
FIG. 6 A sectional view of the exemplary embodiment of a cutting roller bearing part according to FIG. 5 in a graduated first sectional plane.

FIG. 6 shows a sectional view of the exemplary embodiment of a cutting roller bearing part in the form of the C-piece 306 according to FIG. 5 in a graduated first sectional plan, identified by VI-VI in the depiction according to FIG. 5, which is aligned with the partial planes thereof parallel to the load bearing surface 506 and lies in approximately the center of the measuring side piece 409. As FIG. 6 shows, the receiving space assembly has a first sensor receiving space 603, which is sealed outwardly by the first sensor receiving space closure 512, and a second sensor receiving space 606, which is sealed outwardly by the second sensor receiving space closure 515. Extending between the sensor receiving spaces 603, 606, which are configured blind-hole-like with a base and respectively extending from the outside towards each other, is a sensor receiving space connection channel 609, which terminates respectively in the base of a sensor receiving space 603, 606.

A first load sensor 612 is attached at the base of the first sensor receiving space 603 and a second load sensor 615 is attached at the base of the second sensor receiving space 606, wherein, as components of a load measuring unit, the load sensors 612, 615 are respectively configured with four strain gauge grids applied to a strain gauge carrier film according to a strain gauge assembly configured like a type of Wheatstone full bridge circuit. This circuitry yields a relatively large, extensively strain-proportional electrical signal transverse to the principle strain direction that lies in the direction of the base section 415.

The receiving space assembly also has a transition channel 618, a main section of which extends between the second sensor receiving space 606 and the electronics receiving space 621, wherein a secondary section that is opposite from the main section extends away from the second sensor receiving space 606 in the direction of the front side of the free end of the measuring side piece 409 and is sealed outwardly by the transition channel closure 509.

Arranged in the electronics receiving space 621, as a further component of the load measuring unit, is a signal processing electronics assembly 624, which is electrically connected to the first load sensor 612 and the second load sensor 615 via sensor connecting cables 627, 630, which run in the main section of the transition channel 618 and in the sensor receiving space connection channel 609. The output signals of the load sensors 612, 615 can be converted into a digital flow of data with the signal processing electronics assembly 624.

The receiving space assembly is furthermore configured with a catcher space 633, which is sealed outwardly by the catcher space closure 518. On the side opposite from the catcher space closure 518, the catcher space 633 borders the electronics receiving space 621, wherein there is a sealing element 636 between the electronics receiving space 621 and the catcher space 633, which is hermetically sealed and is thereby in particular gas-, vapor- and water-tight.

The sealing element 636 is constructed of an exterior-side metal wall, which is welded with the wall of the receiving space assembly in the transition region between the electronics receiving space 621 and the catcher space 633, with an interior glass body, through which a number of connecting pins 639 are guided as through-lines. As a result, the electronics receiving space 621, the transition channel 618 and the sensor receiving spaces 603, 606 with the sensor receiving space connection channel 609 extending between them are hermetically separated from the external atmosphere, and thereby in particular gas-, vapor- and water-tight, whereby a precise functionality that is stable over the long term of the load sensors 612, 615 and of the signal processing electronics assembly 624 is yielded.

On the side facing the electronics receiving space 621, the connecting pins 639 are connected to the signal processing electronics assembly 624 via enameled wires 642, whereas, on the side facing the catcher space 633, the connecting pins 639 are likewise connected via enameled wires 645 to the multi-strand connection cable 503 located in a connecting channel 648 of the receiving space assembly extending at a right angle to the sectional plane according to FIG. 6.

Figure 7:
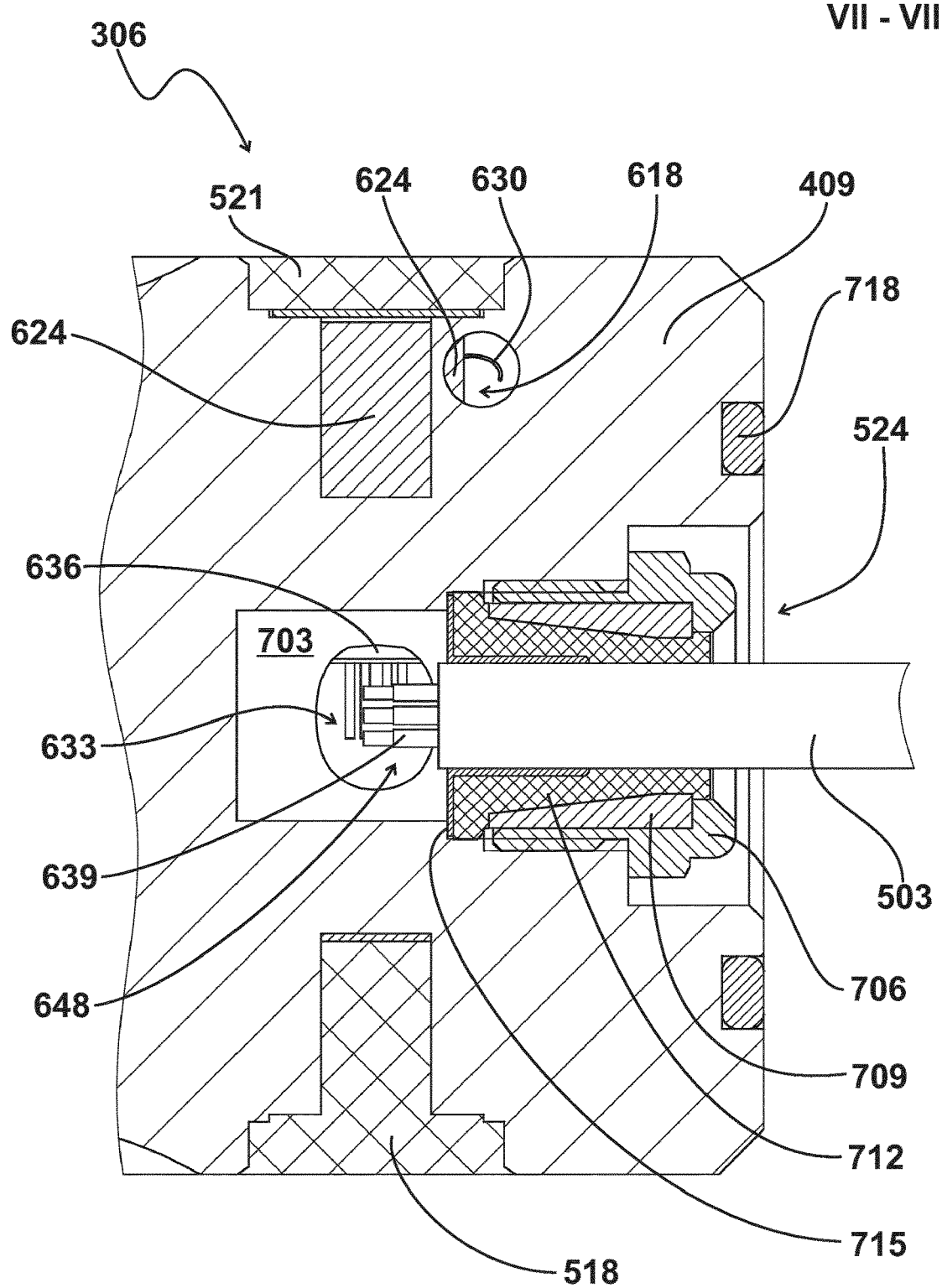
FIG. 7 A sectional view of the exemplary embodiment of a cutting roller bearing part according to FIG. 5 in another sectional plane.

FIG. 7 shows a sectional view of the exemplary embodiment of a cutting roller bearing part in the form of the C-piece 306 according to FIG. 5 in another sectional plane identified by VII-VII in FIG. 6, which is at a right angle to the sectional plane according to FIG. 6 and is located with respect to the center plane of the measuring side piece 409 offset in the region of the cable feedthrough closure 524. It is evident from FIG. 7 that the connecting channel 648 terminates on the side thereof facing away from the catcher space 633 in a connection cable receiving space 703 of the receiving space assembly, which connection cable receiving space is outwardly sealed so it is vapor- and water-tight to a certain extent with the cable feedthrough closure 524, which is mechanically anchoring in the measuring side piece 409 and surrounding the connection cable 503.

The cable feedthrough closure 524 is for example a closure that is known per se with an outward hollow screw 706 positioned rotatably in the measuring side piece 409, which hollow screw surrounds an axially internally widening conical sleeve 709 and encompasses the conical sleeve 709 on the axial exterior side with a shoulder projecting radially inwardly. The conical sleeve 709 rests in turn on the radial interior side at a complementarily formed conical seal 712, which on the axial end side hits against a guide sleeve 715, which, by abutting an annular step located in front of the connection cable receiving space 703, blocks a shifting of the cable feedthrough closure 524 in the connection cable receiving space 703. When the hollow screw 706 is screwed in, the conical sleeve 709 consequently experiences an axial movement inwardly in the direction of the connection cable receiving space 703, whereby, due to the wedge-like form fit between the conical sleeve 709 and the conical seal 712, the conical seal 712 presses on the connection cable 503 in a sealing manner.

Furthermore, the depiction according to FIG. 7 shows that an O-ring 718 in a groove is arranged around the cable feedthrough closure 524, in order to protectively seal the region around the cable feedthrough closure 524 to a certain extent in the installed arrangement of the C-piece 306.

Figure 8:
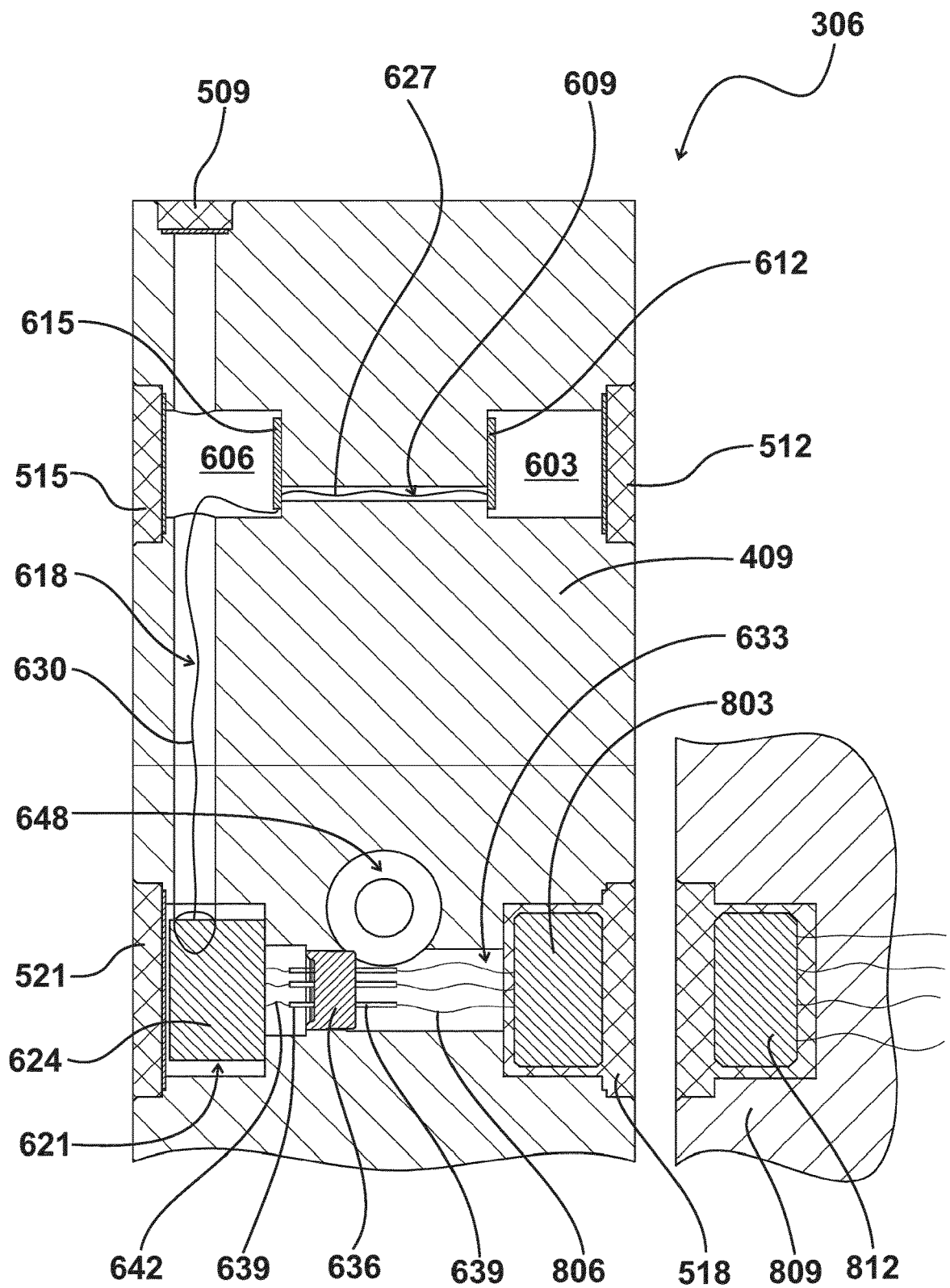
FIG. 8 A sectional view corresponding to FIG. 6 of another exemplary embodiment of a cutting roller bearing part, which is equipped with an inductive outcoupling and FIG. 9 A sectional view of an exemplary embodiment of a cutting roller holder with a cutting roller bearing part, which is equipped with an inductive outcoupling.

FIG. 8 shows a sectional view corresponding to FIG. 6 of another exemplary embodiment of a cutting roller bearing part in the form of a C-piece 306 according to FIG. 5, which is equipped with an inductive outcoupling, and except for the connection cable 503 and the cable feedthrough closure 524, is configured like the exemplary embodiment of a cutting roller bearing part explained on the basis of FIG. 6 and FIG. 7. As a result, in the depictions according to FIG. 6, FIG. 7 and FIG. 8, elements that correspond to each other are provided with the same reference numbers and are not explained in more detail in the following. In the case of the exemplary embodiment according to FIG. 8, a first induction coupling unit 803 is integrated into the catcher space closure 518, which induction coupling unit is connected via enameled wires 806 to the connecting pins 639 on the catcher space side of the sealing element 636. The signal processing electronics assembly 624 can be supplied with electrical energy with the first induction coupling unit 803. Furthermore, the digital flow of data from the signal processing electronics assembly 624 can be coupled out from the C-piece 306 with the first induction coupling unit 803.

A second induction coupling unit 812 integrated in a receiving body 809 is present to collect the digital flow of data.

It is understood that the receiving spaces 603, 606, 621, 633, 648, 703 and the transition channel 618 of the receiving space assembly can also be arranged mirror-inverted as compared to the exemplary embodiments according to the invention that were explained on the basis of FIG. 6 to FIG. 8.

Figure 9:
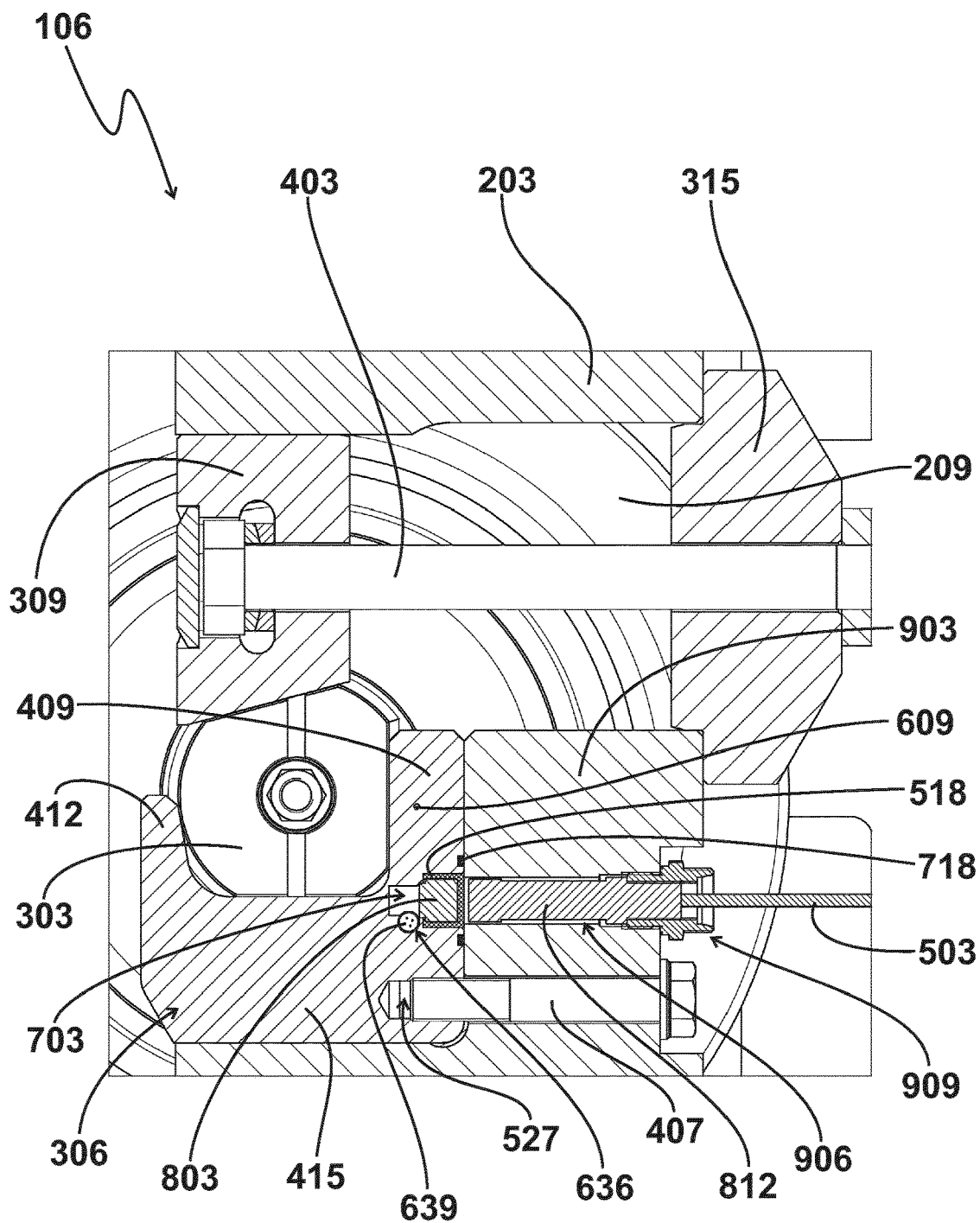

FIG. 9 shows a sectional view of an exemplary embodiment of a cutting roller holder with a C-piece 306 as a cutting roller bearing part, which is equipped with an inductive outcoupling, wherein in the case of the exemplary embodiments explained above on the basis of FIG. 6 to FIG. 8 and in the case of the exemplary embodiment according to FIG. 9, elements that correspond to each other are provided with the same reference numbers and to avoid repetition are not explained again in detail in some cases.

The exemplary embodiment according to FIG. 9 depicts the C-piece 306 resting against an abutment base 903 of the cutting roller housing 203, with which the C-piece 306 is detachably connected with the fastening screw 407. The second induction coupling unit 812 is arranged in the abutment base 903 in a receiving recess 906 crossing the abutment base 903 and opposite from the first induction coupling unit 803. On the side of the abutment base 903 opposite from the C-piece 306, the receiving recess 906 is provided with a hydraulic screw-in connection piece 909, through which the connection cable 503, which is connected in this exemplary embodiment to the second induction coupling unit 812, is guided out. This exemplary embodiment is characterized by a mechanically simple as well as resilient and electrically reliable connection of the C-piece 306 to the cutting roller housing 203.

The invention claimed is:

1. A cutting roller bearing part for use in a cutting roller holder in a cutting wheel of a tunnel boring machine, comprising:
   a load measuring unit disposed within a receiving space assembly, the load measuring unit including at least one load sensor and a strain gauge assembly disposed at a base of at least one sensor receiving space of the receiving space assembly of the cutting roller bearing part;
   the load measuring unit further comprising a signal processing electronics assembly disposed in an electronics receiving space of the receiving space assembly, the receiving space assembly including a transition channel connecting the sensor receiving space to the electronics receiving space; and
   the sensor receiving space, the transition channel, and the electronics receiving space hermetically sealed from an outside of the cutting roller bearing part and the electronics receiving space hermetically sealed on an inside of the cutting roller bearing part against an external atmosphere with a sealing element that includes through-lines.

2. The cutting roller bearing part of claim 1, wherein the load measuring unit includes two load sensors respectively arranged in a sensor receiving space of the receiving space assembly, and wherein the sensor receiving spaces are connected to each other by a sensor receiving space connection channel of the receiving space assembly.

3. The cutting roller bearing part of claim 2, wherein the cutting roller bearing part is configured as a C-piece, which is C-shaped with a measuring side piece and a counter side piece opposite from the measuring side piece and connected to the measuring side piece by a base section.

4. The cutting roller bearing part of claim 3, wherein the load sensors are arranged on both sides of a center plane of measuring side piece.

5. The cutting roller bearing part of claim 1, wherein the sealing element is disposed between the electronics receiving space and a catcher space of the receiving space assembly, and wherein the sealing element includes and outside metal wall and an inside glass body surrounding the through-lines.

6. The cutting roller bearing part of claim 5, wherein the catcher space is in communication with the external atmosphere via a cable feedthrough closure.

7. The cutting roller bearing part of claim 5, wherein the catcher space is hermetically sealed against an external atmosphere with a catcher space closure, the catcher space closure including an induction coupling unit.

8. A cutting roller holder for a cutting wheel of a tunnel boring machine, including at least one cutting roller bearing part according to claim 1.

9. The cutting roller holder of claim 8, further comprising an additional induction coupling unit disposed in an abutment base of a cutting roller housing on which the cutting roller bearing part is attached.

10. A cutting wheel for a tunnel boring machine, including at least one cutting roller holder of claim 8.

11. A tunnel boring machine, including a cutting wheel of claim 10.

* * * * *